United States Patent
Cross

(10) Patent No.: US 6,376,003 B1
(45) Date of Patent: *Apr. 23, 2002

(54) LOW DENSITY MARSHMALLOW-LIKE PRODUCTS AND METHODS OF PRODUCING THE SAME

(75) Inventor: James C. Cross, Overland Park, KS (US)

(73) Assignee: Shade Foods, Inc., New Century, KS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,737

(22) Filed: Oct. 16, 1999

(51) Int. Cl.$^7$ .................................................. A23J 3/00
(52) U.S. Cl. ........................................ 426/571; 426/660
(58) Field of Search ................................ 426/571, 572, 426/570, 660

(56) References Cited

U.S. PATENT DOCUMENTS

| | | | | |
|---|---|---|---|---|
| 1,601,302 | A | * | 9/1926 | Farley, Jr. |
| 2,522,050 | A | * | 9/1950 | Lenderink |
| 2,847,311 | A | * | 8/1958 | Doumak et al. |
| 2,926,121 | A | * | 2/1960 | Hobbs et al. |
| 3,024,115 | A | * | 3/1962 | Loncar |
| 3,062,661 | A | * | 11/1962 | Doumak |
| 3,210,198 | A | * | 10/1965 | Keller |
| 3,338,721 | A | * | 8/1967 | Schoonover |
| 3,345,186 | A | * | 10/1967 | Kania et al. |
| 3,607,309 | A | * | 9/1971 | Olney et al. |
| 3,615,592 | A | * | 10/1971 | Peterson |
| 3,710,538 | A | * | 1/1973 | Lowy et al. |
| 4,018,901 | A | * | 4/1977 | Hayward et al. |
| 4,049,832 | A | * | 9/1977 | Hayward et al. |
| 4,104,405 | A | * | 8/1978 | Forkner |
| 4,107,334 | A | * | 8/1978 | Jolly |
| 4,120,627 | A | | 10/1978 | Abe |
| 4,120,987 | A | * | 10/1978 | Moore |
| 4,145,448 | A | * | 3/1979 | Hayward et al. |
| 4,152,462 | A | * | 5/1979 | Hayward et al. |
| 4,152,463 | A | * | 5/1979 | Hayward et al. |
| 4,251,561 | A | | 2/1981 | Gajewski |
| 4,346,116 | A | * | 8/1982 | Verwaerde et al. |
| 4,390,450 | A | * | 6/1983 | Gibson et al. |
| 4,468,409 | A | * | 8/1984 | Metzroth |
| 4,514,432 | A | * | 4/1985 | Grzinia |
| 4,714,620 | A | * | 12/1987 | Bunick et al. |
| 4,749,575 | A | * | 6/1988 | Rotman |
| 4,785,551 | A | | 11/1988 | Meyer |
| 4,837,382 | A | * | 6/1989 | Ruegg et al. |
| 4,925,380 | A | | 5/1990 | Meisner |
| 5,019,404 | A | | 5/1991 | Meisner |
| 5,030,460 | A | * | 7/1991 | Baggerly |
| 5,230,918 | A | * | 7/1993 | Anderson et al. |
| 5,342,635 | A | * | 8/1994 | Schwab et al. |
| 5,429,830 | A | * | 7/1995 | Janovsky et al. |
| 5,451,419 | A | * | 9/1995 | Schwab et al. |
| 5,462,760 | A | * | 10/1995 | Serpelloni et al. |
| 5,532,017 | A | * | 7/1996 | O'Donnell et al. |
| 5,580,601 | A | * | 12/1996 | Ribadeau-Dumas et al. |

FOREIGN PATENT DOCUMENTS

| | | | |
|---|---|---|---|
| DE | 3211681 | * | 3/1982 |
| JP | 60-237947 | * | 11/1985 |

OTHER PUBLICATIONS

Minifie, "Chocolate, Cocoa, and Confectionery", Third Edition, p. 572 (1989).*

* cited by examiner

Primary Examiner—Nina Bhat
(74) Attorney, Agent, or Firm—Hovey Williams LLP

(57) ABSTRACT

Improved dehydrated marshmallow products and methods of forming the products are provided. Broadly, the products are formed from a mixture comprising sugar, water, and a protein or protein-containing ingredient other than gelatin. The protein is preferably present at a level of at least about 4% by weight, based upon the total weight of the mixture taken as 100% by weight. In one embodiment the products comprise additional ingredients such as flour or other fillers, chemical gassing compounds (e.g., sodium bicarbonate, monocalcium phosphate, and sodium aluminum phosphate), flavoring agents, coloring agents, and preservatives. The processes by which the marshmallows are formed comprise mixing the ingredients to yield a doughy mixture, forming the mixture into the desired shapes without starch application, and drying the shapes to yield the final expanded products which have a bulk density of less than about 23 lbs/ft$^3$.

24 Claims, No Drawings

LOW DENSITY MARSHMALLOW-LIKE PRODUCTS AND METHODS OF PRODUCING THE SAME

BACKGROUND OF THE INVENTION

1. Field of the Invention

The present invention is broadly concerned with confections, and methods of forming these. More particularly, the confections are dehydrated marshmallow-like products formed from a mixture comprising sugar, water, and a protein preferably selected from the group consisting of egg albumen, whey protein, and soy protein. The methods of forming the products comprise forming a mixture of the ingredients, creating the desired shapes from the mixture, and drying the mixture so as to yield the chemically expanded marshmallow products. The inventive marshmallow products have a relatively low density and are essentially gelatin free.

2. Description of the Prior Art

Dehydrated marshmallow pieces have been used in children's cereals for a number of years. These marshmallows have generally been formed by creating and coloring a slurry including water, sugar, and gelatin, whipping the slurry so as to produce an aerated product, extruding the product at a water content of 10–16% by weight, and cutting the product to the desired size and shape. The cut product is then air-dried to a final moisture content of about 1.5–2.5% by weight.

There are numerous shortcomings in the currently available marshmallow products and processes for forming those products. For example, during the cutting of the marshmallow product a significant quantity of starch (as high as 20% by weight) must be utilized to prevent sticking or caking of the product and to improve the product flow. The starch must then be removed prior to sale, with the starch removal being a messy process which increases the overall expense involved.

Another problem with prior art marshmallows is that they have a limited cereal bowl life. Over time, all marshmallow products begin to react with the milk in the bowl, resulting in a soggy marshmallow. Many currently available dehydrated marshmallow products almost completely disintegrate after about thirty seconds in milk. Cereal manufacturers are continually seeking dehydrated marshmallows which retain their initial integrity in milk for longer periods of time, so as to allow the cereal eater to consume essentially the entire bowl of cereal before the marshmallows disintegrate.

Yet another problem with currently available marshmallows is that they contain gelatin, thus making them non-kosher. This prevents an appreciable number of potential consumers from purchasing products containing these marshmallows. Additionally, because the marshmallow products aren't kosher, any equipment that produces these marshmallows or products incorporating these marshmallows, is also non-kosher. This can lead to downtime and added expense for manufacturers who need kosher equipment.

Finally, the currently available processes for forming dehydrated marshmallow products are limited to products having simple two-dimensional shapes (e.g., hearts, moons, rainbows). There are no processes for forming dehydrated marshmallows having intricate three-dimensional shapes which would be appealing to many consumers.

SUMMARY OF THE INVENTION

The instant invention addresses the foregoing problems by providing kosher dehydrated marshmallow products which have an improved bowl life and can readily be formed into a wide variety of shapes.

In more detail, the moldable, expanded confections or dehydrated marshmallows of the invention are formed from a mixture comprising sugar, water, and a protein. The sugar is preferably present in the mixture at a level of from about 69–80% by weight, and preferably 71–76% by weight, based upon the total weight of the mixture taken as 100% by weight. There should also be sufficient water present in the mixture so that the total mixture moisture content is from about 6–12% by weight, and preferably from about 7–9% by weight, based upon the total weight of the mixture taken as 100% by weight.

Examples of preferred proteins for use in the marshmallows are those selected from the group consisting of egg albumen, soy protein, whey protein, and mixtures thereof. The total protein present in the mixture is preferably at least about 4% by weight, and preferably from about 5–10% by weight, based upon the total weight of the mixture taken as 100% by weight. Also, unlike prior art marshmallow products, the inventive marshmallows do not require gelatin and are, therefore, essentially gelatin free. As used herein, "essentially gelatin free" means that the products contain less than about 0.05% by weight gelatin, preferably less than about 0.02% by weight gelatin, and more preferably 0% by weight gelatin, based upon the total weight of the mixture taken as 100% by weight.

In one embodiment, it is preferred that the marshmallow products further comprise compounds which provide controlled chemical gassing for expanding the marshmallows. This eliminates the problems of prior art mechanical expansion methods which cannot be easily controlled, and which utilize equipment requiring regular maintenance. The most preferred gassing compounds are sodium bicarbonate and monocalcium phosphate. In a preferred embodiment both sodium bicarbonate and monocalcium phosphate are present in the mixture at a level of from about 0.4–0.6% by weight and from about 0.6–0.8% by weight, respectively, based upon the total weight of the mixture taken as 100% by weight. In some applications, a small amount of sodium aluminum phosphate (e.g., less than about 0.1% by weight) may be added in order to promote even gassing of the product.

There are numerous other optional ingredients which are preferably included in the marshmallow products. For example, it is desirable to include a filler of some type, with flour being a preferred filler. The filler is useful for reducing the stickiness of the mixture. In order to ensure maximum sweetness of the product, the level of filler in the mixture should be less than about 20% by weight, and preferably from about 5–10% by weight, based upon the total weight of the mixture taken as 100% by weight.

Other optional ingredients that can be utilized include flavoring agents, preservatives, coloring agents, and nutritional supplements (e.g., vitamin supplements and/or mineral supplements such as calcium). Any known flavoring agent can be utilized, with marshmallow flavoring and orange flavoring being two examples. Likewise, any known preservative is suitable, with preferred preservatives being selected from the group consisting of sorbates (e.g., potassium sorbate), propionates (e.g., calcium propionate), and benzoates (e.g., sodium benzoate).

The inventive marshmallows are prepared by forming a mixture having a dough-like consistency and comprising sugar, water, the protein or protein-containing ingredient, and any additional ingredients as discussed above. During this forming step, preferably the dry ingredients are intimately blended and then mixed with a solution comprising the remaining ingredients at temperatures of less than about 120° F., and more preferably from about 70–80° F. Overmixing should be avoided to prevent the dough from becoming too sticky. Preferred mixing times are less than about 15 minutes, and preferably from about 3–8 minutes. Also, during formation of the mixture, it is preferred that the mixing be carried out in such a manner so as to essentially avoid aeration of the mixture. Towards this end, none of the process should be carried out in any type of aeration device as is conventional in the prior art processes.

The resulting mixture is then dried in air having a temperature of from about 170–210° F. to yield the final chemically expanded product. As used herein, chemically expanded means the expansion takes place as a result of a chemical reaction within the product rather than by mechanical expansion such as by whipping or gas injection.

The foregoing temperature range is important because, if the temperature is too low, proper expansion of the product will not be obtained. On the other hand, if the temperature is too high, the product will be baked rather than simply dried and expanded. Preferably, the product is dried for about 15 minutes at about 190° F., with the preferred mode of drying being convection drying.

After drying, the product must be carefully handled as it is fragile until its temperature has cooled to below about 130° F. The dried product has a substantially decreased density compared to the density of the doughy mixture immediately prior to drying and expansion. That is, the bulk density of the doughy mixture is typically around 32–33 lbs/ft$^3$, while the bulk density of the expanded product is less than about 23 lbs/ft$^3$, and preferably from about 16–20 lbs/ft$^3$.

Those skilled in the art will appreciate that in most applications it will be desirable to form the marshmallows into various shapes for use in certain products such as children's cereals. This can be readily accomplished by forming the doughy mixture into shapes prior to the above-discussed drying step. While the material can be extruded into shapes as is the case with prior art shaped marshmallow products, the inventive marshmallows are not so limited. For example, the mixture can be rolled into thin sheets (preferably less than about ⅛ inch in thickness) and the desired images stamped into the sheets. Alternately, the dough can be passed through a system of rollers to form images in the sheet. An example of this method is the widely known cookie and cracker wire-cutting technology wherein one of the rolls includes a series of recessed impressions formed on its surface corresponding to the desired final shape, including three dimensional shapes. Finally, the shapes can also be formed by other conventionally known roller-forming techniques.

Any excess material which is removed during these shaping methods can be completely reused if desired. However, it is preferred that each batch of material comprise only about 10–15% by weight of recycled material. Also, during all processes utilizing rollers, frictional heat may pose a problem and, therefore, the roller surfaces should be chilled sufficiently so as to maintain a dough temperature of below about 120° F., and preferably from about 70–80° F.

One significant advantage of the inventive methods over the prior art is that the foregoing shape-forming steps can be carried out without the application of starch to the mixture as was required in large quantities by the prior art processes. This allows for a much cleaner and simpler process.

DETAILED DESCRIPTION OF THE PREFERRED EMBODIMENTS

EXAMPLES

The following examples set forth preferred methods in accordance with the invention. It is to be understood, however, that these examples are provided by way of illustration and nothing therein should be taken as a limitation upon the overall scope of the invention.

Example 1

Albumen, flour, sugar, sodium bicarbonate, and monocalcium phosphate were dry-blended in a Littleford mixer. A solution of water, marshmallow flavor, and potassium sorbate was formed, with a coloring agent being added to the solution. The dry mixture and solution were then mixed in a Hobart type mixer for about 5 minutes at temperatures of 70–80° F.

The resulting dough was then formed into a very thin sheet (about ⅛ inch thick), and the desired shapes were stamped into the sheeted dough. After stamping, the remaining dough (i.e., the "scraps") were set aside for re-use.

The resulting miniature, shaped pieces were then transferred to a convection dryer and dried for 15 minutes at 190° F. The dried pieces were allowed to cool below 130° F. prior to further handling. After drying and expansion of the product, the density of the product changed dramatically, decreasing from a bulk density of 32.9 lbs/ft$^3$ to a bulk density of 17.2 lbs/ft$^3$. Table 1 sets forth the quantities of the various ingredients utilized in this example.

TABLE 1

| INGREDIENT | % BY WEIGHT[a] |
|---|---|
| Dried egg albumen | 7.0% |
| Flour | 7.0% |
| Sugar | 74.8% |
| Sodium bicarbonate | 0.5% |
| Monocalcium phosphate | 0.7% |
| Water | 9.2% |
| Marshmallow flavor | 0.6% |
| Potassium sorbate | 0.2% |
| TOTAL | 100.0% |

[a]% by weight, based upon the total weight of all ingredients used taken as 100% by weight.

Example 2

Other types of proteins can be utilized to form the inventive marshmallow pieces. For example, whey protein concentrate or soy protein concentrate can be utilized in place of egg protein, if desired. However, these proteins should generally be used at higher concentrations than egg protein. Example 1 was repeated utilizing the alternate proteins and formulas set forth in Tables 2–4.

TABLE 2

| Whey Protein | |
|---|---|
| INGREDIENTS | % BY WEIGHT[a] |
| Whey protein concentrate | 12.0% |
| Flour | 5.0% |
| Sugar | 71.8% |
| Sodium bicarbonate | 0.5% |

TABLE 2-continued

Whey Protein

| INGREDIENTS | % BY WEIGHT[a] |
|---|---|
| Monocalcium phosphate | 0.7% |
| Water | 9.2% |
| Marshmallow flavor | 0.6% |
| Potassium sorbate | 0.2% |
| TOTAL | 100% |

[a] % by weight, based upon the total weight of all ingredients used taken as 100% by weight.

TABLE 3

Soy Protein

| INGREDIENTS | % BY WEIGHT[a] |
|---|---|
| Soy protein concentrate | 12.0% |
| Flour | 5.0% |
| Sugar | 71.8% |
| Sodium bicarbonate | 0.5% |
| Monocalcium phosphate | 0.7% |
| Water | 9.2% |
| Marshmallow flavor | 0.6% |
| Potassium sorbate | 0.2% |
| TOTAL | 100% |

[a] % by weight, based upon the total weight of all ingredients used taken as 100% by weight.

TABLE 4

Whey Protein and Egg Albumen

| INGREDIENTS | % BY WEIGHT[a] |
|---|---|
| Egg albumen | 5.0% |
| Whey protein concentrate | 5.0% |
| Flour | 7.0% |
| Sugar | 71.8% |
| Sodium bicarbonate | 0.5% |
| Monocalcium phosphate | 0.7% |
| Water | 9.2% |
| Marshmallow flavor | 0.6% |
| Potassium sorbate | 0.2% |
| TOTAL | 100% |

[a] % by weight, based upon the total weight of all ingredients used taken as 100% by weight.

Example 3

In some applications, it may be preferable to extrude the material (formed as described in Example 1) through an extruder die having geometrically shaped orifices, with a knife assembly positioned adjacent the orifices for cutting the extrudate into pieces having the desired size. The pieces can then be dried as described in Example 1. An example of a formula suitable for forming an extruded marshmallow product according to the invention is shown in Table 5.

TABLE 5

Extrudable Marshmallow Product

| INGREDIENTS | % BY WEIGHT[a] |
|---|---|
| Dried egg albumen | 6.70% |
| Flour | 6.70% |
| Sugar | 71.40% |

TABLE 5-continued

Extrudable Marshmallow Product

| INGREDIENTS | % BY WEIGHT[a] |
|---|---|
| Sodium bicarbonate | 0.48% |
| Monocalcium phosphate | 0.66% |
| Water | 13.30% |
| Marshmallow flavor | 0.57% |
| Potassium sorbate | 0.19% |
| TOTAL | 100% |

[a] % by weight, based upon the total weight of all ingredients used taken as 100% by weight.

Example 4

Variations of the foregoing formulas can be made to alter the product for different applications. For example, flavoring can be added to the ingredients to yield a marshmallow-like piece having a specific taste. Table 6 sets forth a formulation for an orange-flavored marshmallow-like piece.

TABLE 6

Flavored Marshmallow Pieces

| INGREDIENTS | % BY WEIGHT[a] |
|---|---|
| Dried Egg albumen | 7.0% |
| Flour | 7.0% |
| Sugar | 74.7% |
| Sodium bicarbonate | 0.5% |
| Monocalcium phosphate | 0.7% |
| Water | 9.2% |
| Orange flavor | 0.5% |
| Potassium sorbate | 0.2% |
| FD & C yellow #6 color - 50% solution | 0.2% |
| TOTAL | 100% |

[a] % by weight, based upon the total weight of all ingredients used taken as 100% by weight.

The expansion of the marshmallow pieces can also be controlled if desired by the use of an ingredient such as sodium aluminum phosphate. Table 7 sets forth one such formulation.

TABLE 7

Sodium Aluminum Phosphate for Controlling Expansion

| INGREDIENTS | % BY WEIGHT[a] |
|---|---|
| Dried egg albumen | 7.0% |
| Flour | 7.0% |
| Sugar | 74.8% |
| Sodium bicarbonate | 0.5% |
| Monocalcium phosphate | 0.7% |
| Sodium aluminum phosphate | 0.07% |
| Water | 9.13% |
| Marshmallow flavor | 0.6% |
| Potassium sorbate | 0.2% |
| TOTAL | 100% |

[a] % by weight, based upon the total weight of all ingredients used taken as 100% by weight.

Yet another variation on the inventive marshmallow products involves the use of coloring agents. It is preferred that the coloring agent be added during the mixing steps, however, the coloring can also be sprayed onto the formed pieces (either before or after drying) if feasible. Table 8 provides an example of one possible formulation utilizing a coloring agent which was mixed with the ingredients.

TABLE 8

Marshmallow Pieces Utilizing a Coloring Agent

| INGREDIENTS | % BY WEIGHT[a] |
|---|---|
| Dried egg albumen | 7.0% |
| Flour | 7.0% |
| Sugar | 74.7% |
| Sodium bicarbonate | 0.5% |
| Monocalcium phosphate | 0.7% |
| Water | 9.1% |
| Marshmallow flavor | 0.6% |
| FD & C red #40 color - 50% solution | 0.2% |
| Potassium sorbate | 0.2% |
| TOTAL | 100% |

[a]% by weight, based upon the total weight of all ingredients used taken as 100% by weight.

Example 5

In some applications, it may be desirable to add vitamins and/or minerals to the products. Tables 9 and 10 provide exemplary formulations including calcium and calcium and vitamin supplemented marshmallow pieces. The products would be formed as described above in Example 1.

TABLE 9

Calcium Fortified Piece

| INGREDIENTS | % BY WEIGHT[a] |
|---|---|
| Egg albumen | 7.0% |
| Flour | 7.0% |
| Calcium carbonate | 3.4% |
| Sugar | 72.0% |
| Sodium bicarbonate | 0.5% |
| Monocalcium phosphate | 0.7% |
| Water | 8.6% |
| Flavor | 0.6% |
| Potassium sorbate | 0.2% |
| TOTAL | 100% |

[a]% by weight, based upon the total weight of all ingredients used taken as 100% by weight.

TABLE 10

Vitamin/Calcium Fortified Piece

| INGREDIENTS | % BY WEIGHT[a] |
|---|---|
| Egg albumen | 7.0% |
| Flour | 6.5% |
| Calcium carbonate | 3.4% |
| Sugar | 72.0% |
| Sodium bicarbonate | 0.5% |
| Monocalcium phosphate | 0.7% |
| Water | 8.6% |
| Flavor | 0.6% |
| Potassium sorbate | 0.2% |
| Vitamin premix | 0.5% |
| TOTAL | 100% |

[a]% by weight, based upon the total weight of all ingredients used taken as 100% by weight.

I claim:

1. A mixture capable of being formed into an expanded, marshmallow-like confection, said mixture being essentially gelatin-free and comprising from about 69–80% by weight sugar, from about 6–12% by weight water, protein flour and at least one chemical gassing agent selected from the group consisting of sodium bicarbonate, monocalcium phosphate and sodium aluminum phosphate, said percentages based upon the total weight of the mixture taken as 100% by weight, and said mixture having a dough-like consistency capable of being rolled into stampable, thin sheets.

2. The mixture of claim 1, said protein being selected from the group consisting of egg albumen, soy protein, whey protein, and mixtures thereof.

3. The mixture of claim 1, wherein said flour is present in said mixture at a level of less than about 20% by weight, based upon the total weight of the mixture taken as 100% by weight.

4. The mixture of claim 1, said mixture further including an ingredient selected from the group consisting of flavoring agents, coloring agents, vitamin supplements, mineral supplements and preservatives.

5. The mixture of claim 4, wherein said ingredient is a preservative selected from the group consisting of sorbates, propionates, and benzoates.

6. The mixture of claim 4, wherein said gassing agents are sodium bicarbonate and monocalcuim phosphate.

7. The mixture of claim 6, wherein said mixture includes from about 0.4–0.6% by weight sodium bicarbonate and from about 0.6–0.8% by weight monocalcium phosphate, based upon the total weight of the mixture taken as 100% by weight.

8. The mixture of claim 4, wherein said mixture includes a flavoring agent, and said flavoring agent is a marshmallow flavoring agent.

9. The mixture of claim 4, wherein said ingredient is a vitamin supplement.

10. The mixture of claim 4, wherein said ingredient is a mineral supplement.

11. The mixture of claim 10, wherein said mineral supplement comprises calcium.

12. The mixture of claim 11, said mixture having a bulk density of from about 32–33 lbs/ft$^3$.

13. The mixture of claim 12, said protein being selected from the group consisting of egg albumen, soy protein, whey protein, and mixtures thereof.

14. The mixture of claim 13, said protein being egg albumen, and said egg albumen being present in said mixture at a level of from about 6–10% by weight, based upon the total weight of the mixture taken as 100% by weight.

15. The mixture of claim 12, said mixture further including an ingredient selected from the group consisting of flavoring agents, coloring agents, vitamin supplements, mineral supplements and preservatives.

16. The mixture of claim 15, wherein said ingredient is a preservative selected from the group consisting of sorbates, propionates, and benzoates.

17. The mixture of claim 15, wherein said gassing agents are sodium bicarbonate and monocalcium phosphate.

18. The mixture of claim 17, wherein said mixture includes from about 0.4–0.6% by weight sodium bicarbonate and from about 0.6–0.8% by weight monocalcium phosphate, based upon the total weight of the mixture taken as 100% by weight.

19. The mixture of claim 15, wherein said mixture includes a flavoring agent, and said flavoring agent is a marshmallow flavoring agent.

20. The mixture of claim 15, wherein said ingredient is a vitamin supplement.

21. The mixture of claim 15, wherein said ingredient is a mineral supplement.

22. The mixture of claim 21, wherein said mineral supplement comprises calcium.

23. A mixture capable of being formed into an expanded, marshmallow-like confection, said mixture being essentially gelatin-free and comprising from about 69–80% by weight sugar, from about 6–12% by weight water, at least one chemical gassing agent selected from the group consisting of sodium bicarbonate, monocalcium phosphate and sodium aluminum phosphate, and protein, said protein being present in said mixture at a level of at least about 4% by weight, said percentages based upon the total weight of the mixture taken as 100%, and said mixture having a dough-like consistency capable of being rolled into stampable, thin sheets.

24. The mixture of claim 23, said mixture having a bulk density of from about 32–33 lbs/ft$^3$.

* * * * *

UNITED STATES PATENT AND TRADEMARK OFFICE
CERTIFICATE OF CORRECTION

PATENT NO. : 6,376,003 B1 Page 1 of 1
DATED : April 23, 2002
INVENTOR(S) : James C. Cross It is certified that error appears in the above-identified patent and that said Letters Patent is hereby corrected as shown below:

Title page,
Item [73], The Assignee is incorrectly listed as "Shade Foods, Inc." and should be listed as -- Kerry Group Services International, Ltd. Tralee, County Kerry, Ireland --

Signed and Sealed this

Twentieth Day of May, 2003

JAMES E. ROGAN
*Director of the United States Patent and Trademark Office*